Dec. 24, 1968          R. TROSETH          3,417,473
UNIVERSAL SUNDIAL
Filed Nov. 15, 1965          2 Sheets-Sheet 1
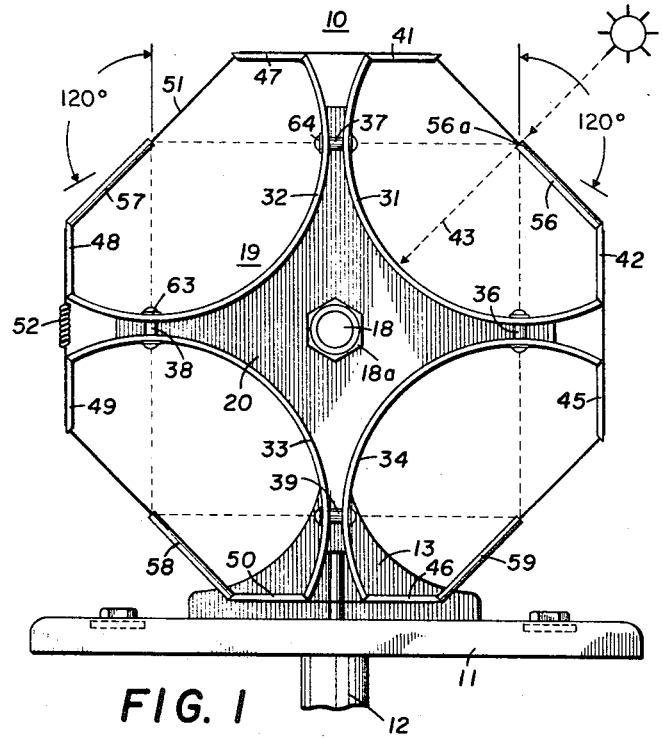
FIG. 1
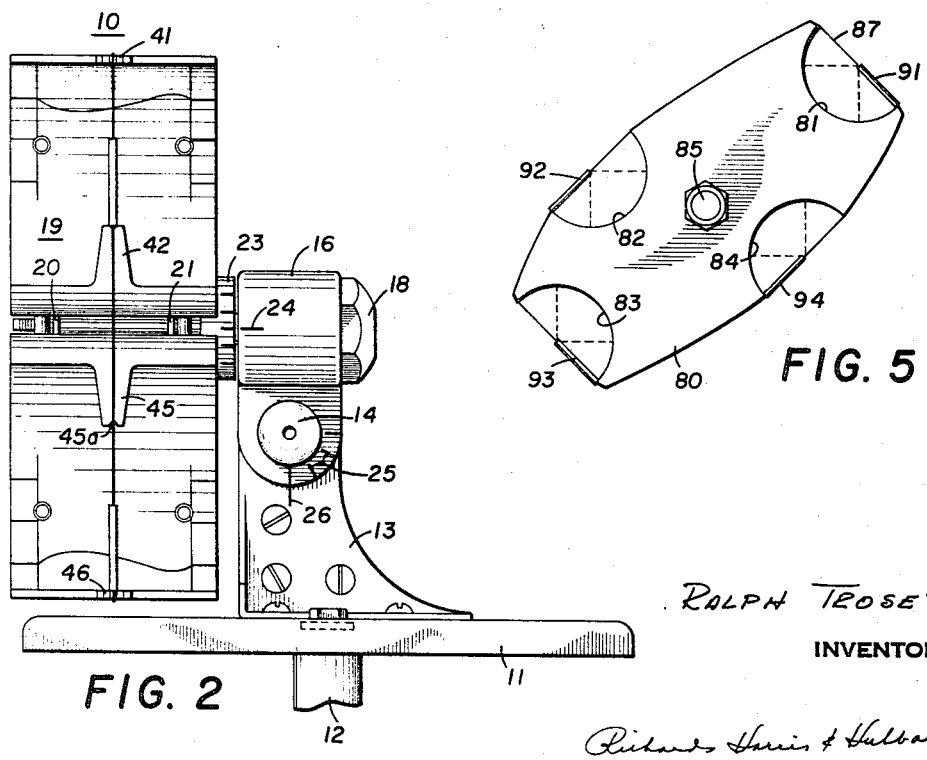
FIG. 2
FIG. 5
RALPH TROSETH
INVENTOR
Richards Harris & Hulbard
ATTORNEY Dec. 24, 1968   R. TROSETH   3,417,473
UNIVERSAL SUNDIAL Filed Nov. 15, 1965   2 Sheets-Sheet 2

RALPH TROSETH
INVENTOR

Richards Harris & Hubbard
ATTORNEY

United States Patent Office 3,417,473
Patented Dec. 24, 1968

3,417,473
UNIVERSAL SUNDIAL
Ralph Troseth, 3402 Banbury Place,
Houston, Tex. 77027
Filed Nov. 15, 1965, Ser. No. 507,870
10 Claims. (Cl. 33—62)

ABSTRACT OF THE DISCLOSURE

Four outwardly concave cylindrically curved sundials are mounted back to back about a time zone adjustment axis settable into parallelism with the earth's axis. One pair is turned upwardly during the half year of lengthening daylight and the other during the other half year. Each pair comprises a morning and an afternoon dial scaled in hours of the day and months, forming a co-ordinate grid with its lines curved for the equation of time. The gnomons are short tubes strung on a cord stretched around the dial assemblage so as to lie along a middle diameter of each cylindrical dial surface.

---

This invention relates to a universal sundial and more particularly, to a solar time device which may provide an accurate measurement of local time as distinguished from apparent sun time. In a further aspect, the invention provides separate and distinctive time measurements for periods when the sun is traveling north and for periods when the sun is traveling south.

Sundials have long been known and are replete in the prior art. The present invention differs from prior art devices in the manner in which representations of the equation of time which relates sun time to a standard time are employed in connection with those periods of time in which the sun moves in different directions.

Further the invention relates to a new sundial construction.

In accordance with the present invention, a sundial is provided for use on a universally rotatable mount. The sundial includes structure supported on the mount for rotation about a primary axis of the mount and having $n$ outwardly facing concave surfaces. Each of the surfaces is cylindrically arcuate. The axes of symmetry of the surfaces are parallel to the primary axis of the mount. Each surface spans sectors of at least $(360/n)°$, where no two sectors are the same and preferably where $n$ is at least four. Each of the surfaces has representations in the form of scales of time inscribed thereon. An index is supported at the axis of symmetry of each of the surfaces and thus is capable of casting a shadow on the associated surface to indicate time.

In a preferred embodiment of the invention, the structure comprises four outwardly facing surfaces which have axes of symmetry parallel to the primary axis of the mount where the surfaces are located equidistant from the primary axis on lines which are mutually perpendicular and intersect at the primary axis. Preferably, representations of the equation of time, relating solar time to standard time, are inscribed on the faces of the arcuate surfaces. In this case, the shadow of the index on the associated surface is indicative of standard time.

For a more complete understanding of the present invention and for further objects and advantages thereof, reference may now be had to the following description taken in conjunction with the accompanying drawings in which:

FIGURE 1 is a front view of the sundial of the present invention;

FIGURE 2 is a right side view of the unit of FIGURE 1;

FIGURE 5 illustrates a modification of the invention.

Figure 3:
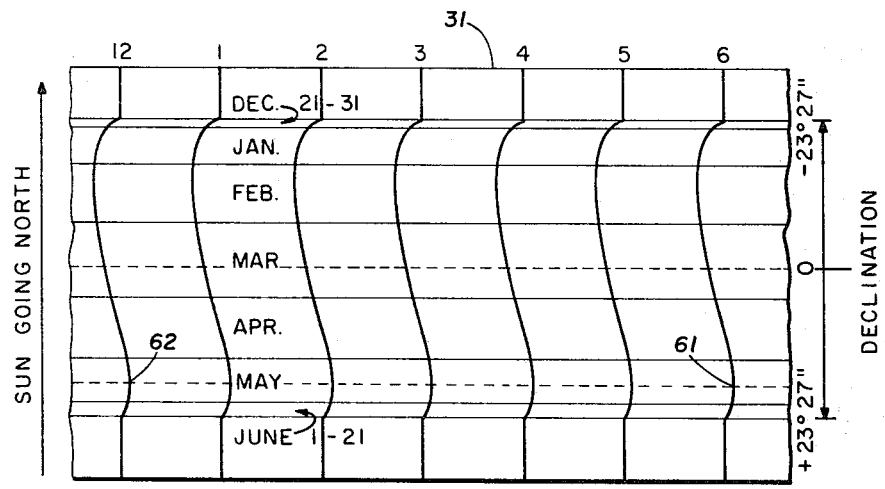
FIGURE 3 is a layout of the surfaces of two of the arcuate plates of FIGURE 1.

In FIGURE 1, a sundial 10 is provided with a base 11 on a pedestal 12. The base 11 will be provided with a suitable leveling screw, well known in the art, a pair of bubble tubes to indicate when the base 11 is level, and a compass.

A standard 13 is mounted on the top of the base 11 and is provided with a shaft 14 which links the standard 13 to a bracket 16. A bolt 18 at the primary axis is mounted in the bracket 16 to support a sundial unit 19. Unit 19 comprises a pair of frame members 20 and 21, only the member 20 being seen in FIGURE 1. As shown in FIGURE 2, the frame members 20 and 21 are plates which are spaced apart and are generally in the form of a cross having arcuate shaped arms. The four arcs thus provided are identical and span arcuate segments which are symmetrical to diagonal axes passing through the primary axis at bolt 18. As shown in FIGURE 2, the bolt 18 has a hub 23 secured thereto which is provided with scaled markings thereon for measuring rotation on the primray axis so that the bolt 18 and the frame members 20 and 21 may be rotated relative to bracket 16. The degree of rotation may be noted relative to an index mark 24 on the bracket 16. Similarly, the bracket 16 may be rotated on shaft 14 with graded scale markings, the marking 25 on the lower end of the bracket 16, being employed with reference to an index mark 26. Thus, the frame comprising members 20 and 21 is universally rotatable since there are three mutually perpendicular axes for rotation, the first axis being the rotation of base 11 relative to or on the pedestal 12, the second being the rotation of the bracket 16 on shaft 14 and the third being the rotation of the frame 20, 21 on bolt 18.

Four arcuate plates 31–34 are mounted in the frame 20, 21 as by rivets or bolts 36–39. Each of the arcuate plates 31–34 spans an arc substantially greater than 90°. As seen in FIGURES 1 and 2, the plate 31, for example, has a pair of tabs 41 and 42 which extend along lines which are oriented at 45° with respect to the bisector 43 of the angle subtended by the arcuate plate 31. Similarly, the plate 34 has tabs 45 and 46. Plate 32 has tabs 47 and 48 and plate 33 has tabs 49 and 50. The tabs 41 and 42 extend to a diameter of the circle which is included in the surface of plate 31.

A cord 51 encircles the unit and is maintained taut by a spring 52. The cord passes over the tabs at the center points thereof and is maintained properly aligned or positioned by notches such as the notch 45a in the end of tab 45.

Four tubes 56–59 are threaded onto the cord 51. The tubes are of length such that when they rest on the end of a given tab, they extend to the center or locus of the arcuate portion of the associated plate. For example, the tube 56, FIGURE 1, rests on the end of the tab 42. The upper end 56a is located at the center point for plate 31. Thus, the end of the tube 56 serves as an index marker for the shadow cast by the sun, as along the bisector 43 onto the plate 31.

FIGURE 3 illustrates a scale inscribed on plates 31, for example. A May afternoon sun would cast a shadow on the plate 31 which would sweep across such scale from point 62 to point 61 from 12 noon through 6 o'clock. A similar scale marking is provided on plate 32 so that the morning sun will cast a shadow off from the end of the tube 57 which will sweep from before 6 o'clock to 12 o'clock mid-day during the morning hours.

Figure 4:
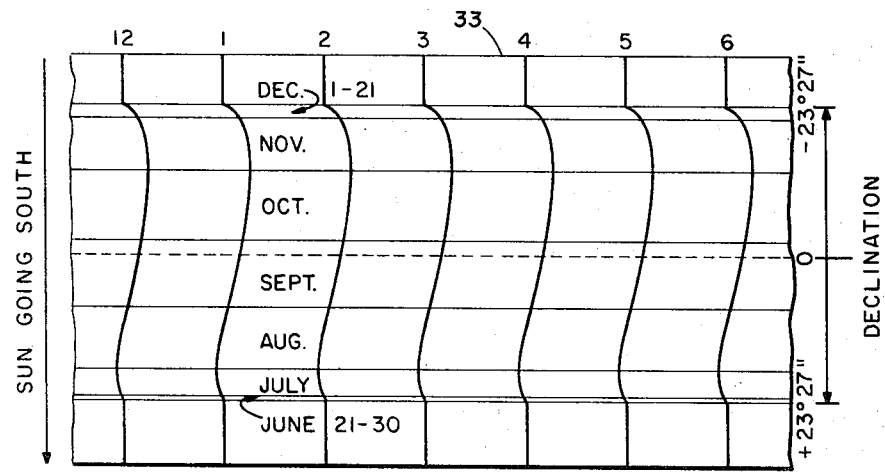
FIGURE 4 is a layout of the other two arcuate plates of FIGURE 2.

It will be noted that the scale illustrated in FIGURE 3 is made up of curves thereon. The curves represent the equation of time which relates sun time to standard time for a period of the year when the sun is moving north. FIGURE 4 illustrates a similar scale to be used on plates 33 and 34 for that period of the year when the sun is moving south.

With the sundial thus set, the time may thereafter be correctly indicated without further adjustment until such time as the sun begins its movement south. At such time, the sundial will be reset by loosening the nut 18a and rotating the sundial structure so that the arcuate plates 33 and 34 are facing upward. The rotation will be adequate to cause the shadow from either tube 58 or tube 59, or both, to fall on the scales on plates 33 and 34 at the given time of day at which the adjustment is made. Thus, for another six months, the sundial may remain fixed to indicate the proper time.

It will now be seen that the universal sundial of this invention thus is an instrument which has a selected Solar Ephemeris of a particular year as its standard of reference for comparison with the sun's apparent position in space for any moment of standard time at any location. A shadow trace of the sun upon a segment of a cylinder, from a fixed point on the axis of such cylinder at selected moments of the standard time, is used as the indicator of the sun's apparent position. The sun's shadow upon the cylinders is constantly moving to a new position and will never return to an old point in the year because different cylinders are provided for the north and the south movements of the sun.

The base 11 is properly positioned when it is level and its latitude adjustment axis is perpendicular to the plane of the meridian of location. The link connecting the base 11 and shaft 14 can be rotated 90 degrees in the plane of the meridian and it is properly positioned when it is rotated and locked at the exact number of degrees of the location latitude.

The supporting frame 21, 22 is mounted upon the primary axis bolt 18 which fits in the base bracket 16 which has its center line in the plane of the local meridian. As above noted, bolt 18 can be rotated 360 degrees. This rotation permits changing of pairs of cylinders to match the north and south movements of the sun and the adjustment for time zone position and daylight saving time.

The instrument cylinders are mounted with their center lines parallel to the shaft axis preferably at a common distance from it and with 90 degrees angular spacing, though, as shown in FIGURE 5, such common distance is not a rigid requirement.

More particularly, as shown in FIGURE 5, a casting 80 is provided with four arcuate portions formed therein. Each of the arcuate portions has a bisector which intersects bisectors of adjacent arcs at right angles. The outwardly facing surfaces 81–84 are concave and are cylindrically arcuate with the axes of symmetry of the surfaces parallel to the primary axis 85. Each surface spans a sector of at least $(360/n)°$, where no two sectors are the same and where $n$ is at least 4. On each of said surfaces, scales representing time are inscribed. An index means, such as the cord 87 with tubes 91–94 thereon, is provided for casting a shadow on its associated surface to indicate time. It will be appreciated that five or more such surfaces might be employed.

The other cylinder assemblies are scaled to provide 24 hours tracking space, with one assembly covering the sun's north migration and the other covering the sun's south migration. The cylinder assemblies are all symmetrical and can be rotated on the instrument for use, as required, in either hemisphere.

The shadow line 51 rests in alignment notches in the cylinders, which notches all lie in a common plane that is perpendicular to the primary axis. The shadow point sleeves rest against extensions of the cylinders and are of the exact length required to terminate at the axis of the cylinder.

Standard time is indicated on each inner edge of each cylinder just beyond the limits of shadow travel. Twelve o'clock noon, standard time, is on the vertical center line of each cylinder. The other hour locations are at 15 degrees intervals less the correction for refraction. The sun's apparent position for each hour of standard time for each day is taken from the selected Solar Ephemeris and plotted on companion cylinders for its north migration and for its south migration.

From the scales of FIGURES 3 and 4 it will now be understood that the sun's shadow trace moves across the face of the sundial's cylinders in the form of a helix of varying pitch. The circumferential portion of this movement is directly related to time and the axial portion is related to the sun's changing declination. The sundial consequently indicates the declination of the sun for each calendar day in the year.

To prepare the sundial for service the longitude and latitude adjustments may first be set at zero. The base is leveled and rotated so that the axis of the shaft 18 is in the plane of the local meridian and the instrument pointing north. The latitude adjustment of shaft 14 is loosened and the cylinder assembly rotated to the exact number of degrees of the local latitude and locked in place. The axis of shaft 18 of the sundial is now parallel with the axis of rotation of the earth. The cylinder assembly is next rotated to the right or left to secure a shadow point reading which is precisely the same as local standard time and then locked in place. The amount of this rotation in degrees is the number of degrees to be added or subtracted from the meridian of the time zone in order to obtain the value of the local longitude.

When daylight saving time is in use, the cylinder assembly is rotated 15 degrees from its standard time setting for each hour of change in time.

What is claimed is:

1. In a sundial having a universally rotatable mount, the combination which comprises:
    (a) structure supported on said mount for rotation about a primary axis of said mount which axis is adjustable to be positioned parallel to the axis of rotation of the earth and having $n$ outwardly facing concave surfaces, each cylindrically arcuate with the axes of symmetry of said surfaces parallel to said primary axis, and each surface spanning sectors of at least $(360/n)°$ where no two sectors face the same direction, where $n$ is at least 4, and where each of said surfaces has representations of time inscribed thereon, and
    (b) index means supported at the axis of symmetry of each of said surfaces, each capable of casting a shadow on its associated surface to indicate time.

2. The combination set forth in claim 1 in which $n=4$ and each of said surfaces has a scale thereon indicative of the equation of time for a six-hour period.

3. The combination set forth in claim 1 in which $n=4$ and two of said surfaces have representations of the equation of time thereon for southward travel of the sun and two, for northward travel of the sun.

4. The combination set forth in claim 1 comprising mount support means including means for independent rotation of said mount about said primary axis and about two axes one of which is perpendicular to said primary axis and to the other axis.

5. The combination set forth in claim 1 in which said surfaces are symmetrically disposed relative to said primary axis.

6. The combination set forth in claim 1 in which four arcuate plates form said surfaces, with structure for supporting said plates in symmetrical array relative to said primary axis.

7. The combination set forth in claim 1, said structure comprising a pair of rectangular plates with corners concavely arcuate and four arcuate plates supported thereon on which said representations of time are inscribed.

8. The combination set forth in claim 1 in which said concave surfaces correspond with quarter sections of a cylinder.

9. The combination set forth in claim 1 in which said index means comprises a taut member which encircles said structure medially and a marker element supported thereby having an end centrally on the axis of curvature of each of said surfaces to provide an index for each said surface.

10. The combination set forth in claim 9 in which said index means comprises a taut flexible filament encircling said structure medially, tubular marker elements strung on the filament each along a diameter of a respective one of said surfaces and each having an end at the mid-point of the axis of curvature of said one of said surfaces and of length to rest at its other end against said structure.

References Cited

UNITED STATES PATENTS

| | | | |
|---|---|---|---|
| 78,133 | 5/1868 | Risch | 33—61 |
| 106,718 | 8/1870 | Pannetrat | 33—62 |
| 303,118 | 8/1884 | Christian | 33—62 |
| 825,319 | 7/1906 | Hewitt | 33—62 |
| 1,629,238 | 5/1927 | Terraz | 33—62 |

R. B. HULL, *Primary Examiner.*